United States Patent
Marable

(10) Patent No.: US 10,703,421 B2
(45) Date of Patent: Jul. 7, 2020

(54) TAILGATE OVERROTATION MECHANISM

(71) Applicant: Jason Marable, St. Clair Shores, MI (US)

(72) Inventor: Jason Marable, St. Clair Shores, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/022,936

(22) Filed: Jun. 29, 2018

(65) Prior Publication Data

US 2020/0001933 A1    Jan. 2, 2020

(51) Int. Cl.
  *B62D 33/027*    (2006.01)
  *B60P 1/43*    (2006.01)
  *B60P 1/26*    (2006.01)

(52) U.S. Cl.
  CPC ............ *B62D 33/0273* (2013.01); *B60P 1/26* (2013.01); *B60P 1/435* (2013.01)

(58) Field of Classification Search
  CPC ......... B62D 33/0273; B60P 1/26; B60P 1/435
  See application file for complete search history.

(56) References Cited

U.S. PATENT DOCUMENTS

| | | |
|---|---|---|
| 563,173 A | 6/1896 | Herriman |
| 6,267,429 B1 | 7/2001 | Kuzmich et al. |
| 8,070,206 B2 | 12/2011 | Zielinsky |
| 8,070,208 B2 | 12/2011 | Zielinsky |
| 8,075,038 B2 | 12/2011 | Zielinsky |
| 2011/0089711 A1 | 4/2011 | Zielinsky |
| 2011/0163565 A1* | 7/2011 | Zielinsky ........... B62D 33/0273 296/57.1 |

* cited by examiner

*Primary Examiner* — D Glenn Dayoan
*Assistant Examiner* — Melissa Ann Bonifazi
(74) *Attorney, Agent, or Firm* — Ralph E Smith

(57) ABSTRACT

A tailgate assembly for a vehicle includes a tailgate configured to rotatably couple to a main body of the vehicle, and an overrotation mechanism coupled to a sidewall of the tailgate. The overrotation mechanism is configured to be disposed between the tailgate and the main body, and to enable the tailgate to move between a closed position and a horizontal open position, and between the horizontal open position and an overrotation position where the tailgate is disposed toward the ground at an angle relative to a horizontal.

9 Claims, 4 Drawing Sheets

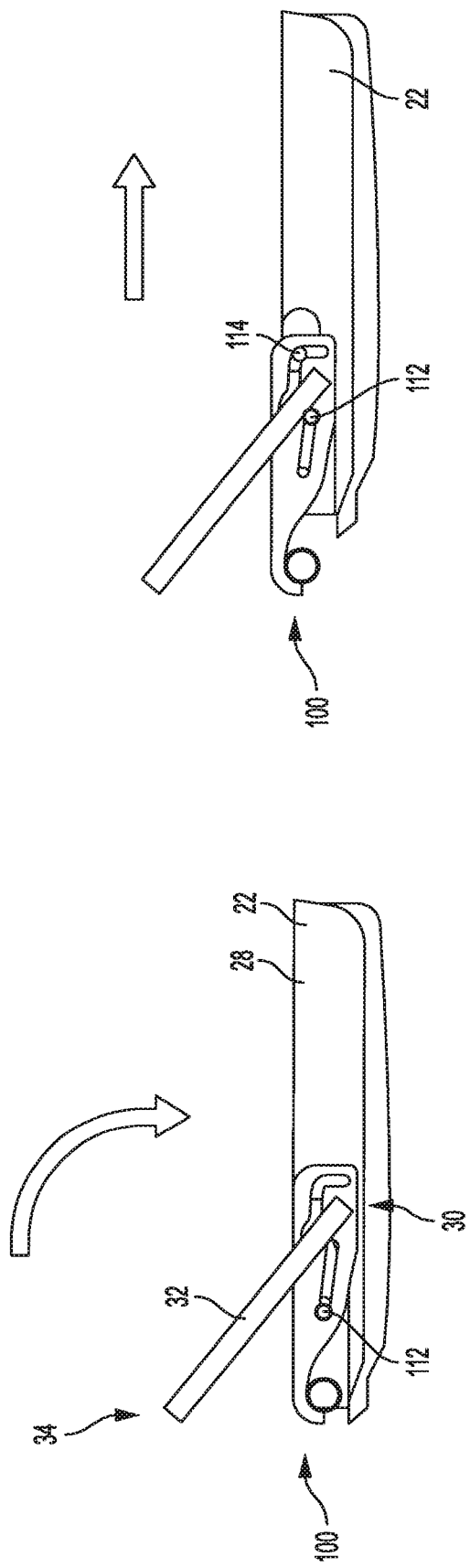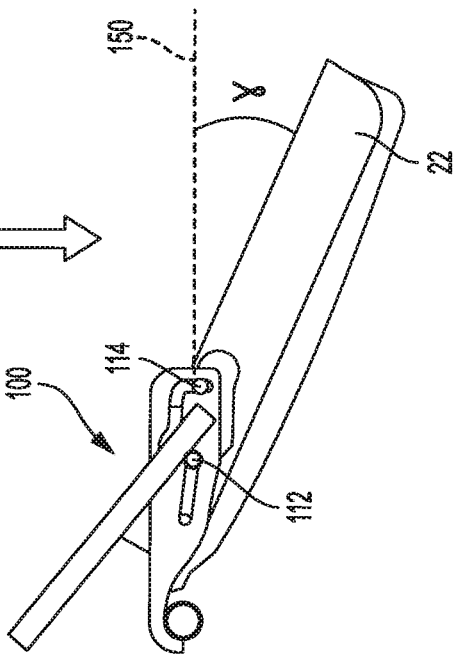

TAILGATE OVERROTATION MECHANISM

FIELD

The present disclosure relates generally to vehicles and, more particularly, to an overrotation mechanism for a vehicle tailgate.

BACKGROUND

Vehicles having storage beds, e.g., pickup trucks, are capable of storing and transporting large objects. Examples of these large objects include recreational vehicles such as all-terrain vehicles (ATVs) and motorcycles. These large objects are typically very heavy and are unable to be lifted into the storage bed by a single person, e.g., a driver of the vehicle. Loading ramps provide for easier loading of these large objects into a storage bed of the vehicle. However, such loading ramps are typically long due to mating with a horizontal tailgate in its open position, and thus difficult to move and store. Thus, while such conventional loading arrangements with conventional tailgates having an horizontal open position work for their intended purpose, there remains a need for improvement in the relevant art.

SUMMARY

In one example aspect a tailgate assembly for a vehicle is provided. In one example embodiment, the tailgate assembly includes a tailgate configured to rotatably couple to a main body of the vehicle, and an overrotation mechanism coupled to a sidewall of the tailgate. The overrotation mechanism is configured to be disposed between the tailgate and the main body, and to enable the tailgate to move between a closed position and a horizontal open position, and between the horizontal open position and an overrotation position where the tailgate is disposed toward the ground at an angle relative to a horizontal.

In addition to the foregoing, the described tailgate assembly may include one or more of the following features: wherein the overrotation mechanism comprises an adaptor plate configured to rotatably couple to the vehicle to enable the tailgate to move between the closed position and the horizontal open position, and a first pin coupled to the tailgate and operably associated with the adaptor plate; wherein the adaptor plate includes a rearward guide slot receiving the first pin, wherein the first pin is configured to translate along the rearward guide slot; wherein the rearward guide slot includes a generally horizontal first portion and a generally vertical second portion such that from the horizontal open position, the first pin translatable along the generally horizontal first portion to move the tailgate away from the vehicle, and the first pin subsequently translatable downward along the generally vertical second portion to move the tailgate to the overrotation position; and wherein the rearward guide slot includes a bump in the generally horizontal first portion configured to maintain the first pin therein to facilitate preventing inadvertent translation of the first pin into the generally vertical second portion.

In addition to the foregoing, the described tailgate assembly may include one or more of the following features: wherein the overrotation mechanism further includes a second pin coupled to the tailgate and operably associated with the adaptor plate; wherein the adaptor plate includes an intermediate guide slot receiving the second pin, wherein the second pin is configured to translate along the intermediate guide slot; wherein the overrotation mechanism includes a hinge configured to rotatably couple to the vehicle to enable rotational movement of the tailgate relative to the vehicle; wherein angle is between approximately 0° and approximately 60°; and wherein angle is between approximately 15° and approximately 45°.

In another example aspect a vehicle is provided. In one example embodiment, the vehicle includes a main body, a tailgate rotatably coupled to the main body, and an overrotation mechanism coupled to a sidewall of the tailgate and disposed between the tailgate and the main body. The overrotation mechanism is configured to enable the tailgate to move between a closed position and a horizontal open position, and between the horizontal open position and an overrotation position where the tailgate is disposed toward the ground at an angle relative to a horizontal.

In addition to the foregoing, the described vehicle may include one or more of the following features: wherein the overrotation mechanism comprises an adaptor plate rotatably coupled to the main body, and a first pin coupled to the tailgate and operably associated with the adaptor plate; wherein the adaptor plate includes a rearward guide slot receiving the first pin, wherein the first pin is configured to translate along the rearward guide slot; wherein the rearward guide slot includes a generally horizontal first portion and a generally vertical second portion such that from the horizontal open position, the first pin translatable along the generally horizontal first portion to move the tailgate away from the vehicle, and the first pin subsequently translatable downward along the generally vertical second portion to move the tailgate to the overrotation position; and wherein the rearward guide slot includes a bump in the generally horizontal first portion configured to maintain the first pin therein to facilitate preventing inadvertent translation of the first pin into the generally vertical second portion.

In addition to the foregoing, the described vehicle may include one or more of the following features: wherein the overrotation mechanism further includes a second pin coupled to the tailgate and operably associated with the adaptor plate; wherein the adaptor plate includes an intermediate guide slot receiving the second pin, wherein the second pin is configured to translate along the intermediate guide slot; wherein the overrotation mechanism includes a hinge rotatably coupled to the main body to enable rotational movement of the tailgate relative to the main body; and wherein the tailgate is slidably coupled to the overrotation mechanism, and wherein the overrotation mechanism is pivotally coupled to the main body to rotatably couple the tailgate to the main body.

In yet another example aspect an overrotation mechanism for a vehicle having a tailgate is provided. In one example embodiment, the overrotation mechanism includes an adaptor plate configured to rotatably couple to the vehicle to enable the tailgate to move between a closed position and a horizontal open position. The adaptor plate includes a rearward guide slot configured to receive a first pin extending from the tailgate and enable the first pin to translate along the rearward guide slot. The rearward guide slot includes a generally horizontal first portion and a generally vertical second portion such that from the horizontal open position, the first pin is translatable along the generally horizontal first portion to move the tailgate away from the vehicle, and the first pin is subsequently translatable along the generally vertical second portion to move the tailgate to an overrotation position where the tailgate is disposed toward the ground at an angle relative to a horizontal.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3A is a side view of the tailgate and the overrotation mechanism of FIG. 2 in a normal open position, according to the principles of the present disclosure;

FIG. 3B is a side view of the tailgate and overrotation mechanism of FIG. 2 in an extended and shifted rearward normal open position, according to the principles of the present disclosure;

FIG. 3C is a side view of the tailgate and overrotation mechanism of FIG. 2 in an overrotated position, according to the principles of the present disclosure.

DESCRIPTION

According to the principles of the present disclosure, an overrotation mechanism for a vehicle tailgate is presented. One example application of the overrotation mechanism enables a truck tailgate to over-rotate and accept a set of ramps, which are shortened for ease of storage. The overrotation mechanism replaces a pivot cup and bracket of a standard tailgate to allow for usage of the tailgate in both normal horizontal deployment or by overrotating an additional amount. Such overrotation enables loading/unloading objects into the truck box with ramps that are shorter than if the tailgate is in the normal horizontal deployment.

Figure 1:
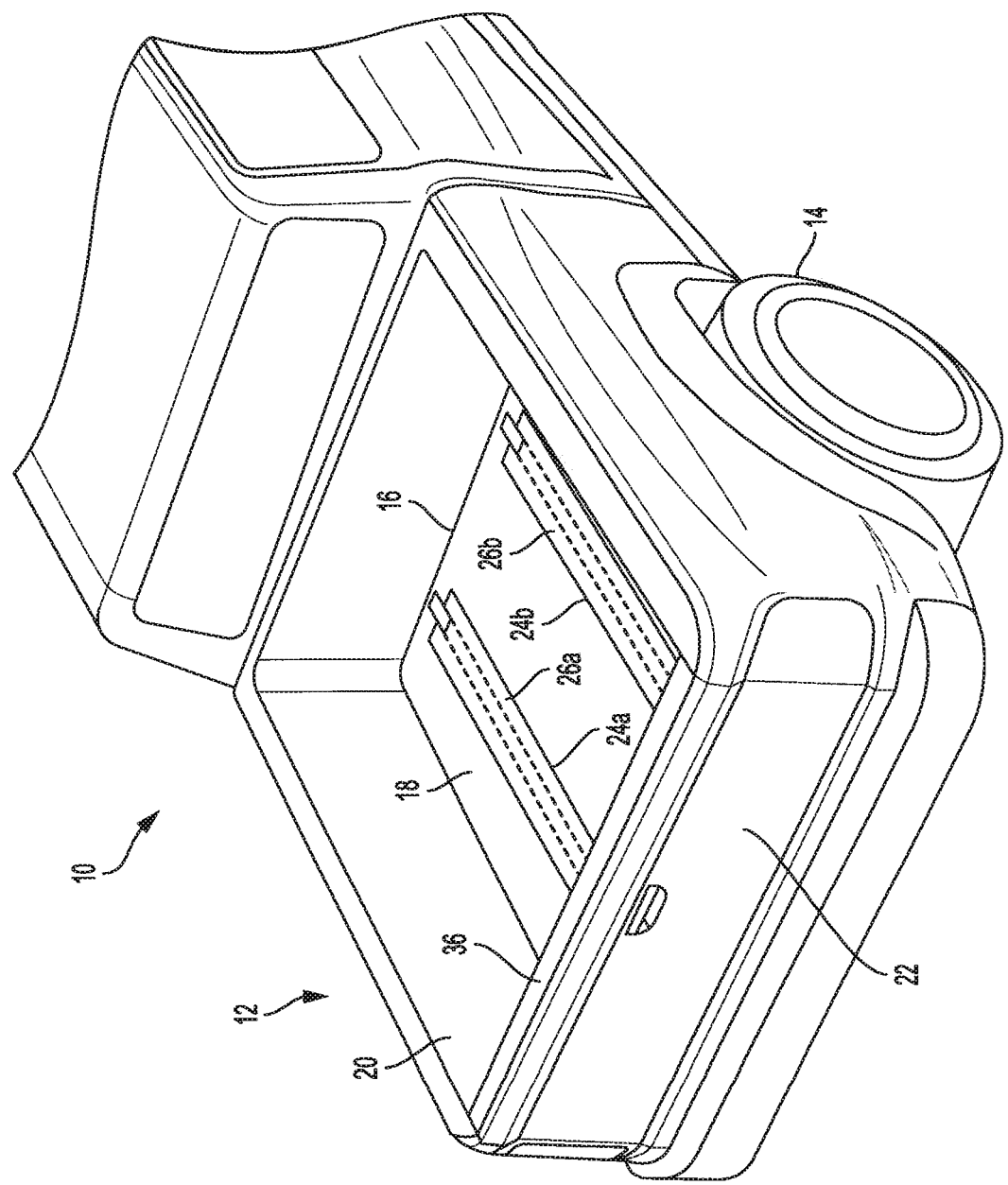
FIG. 1 is a rear perspective view of a vehicle having a storage bed with a tailgate in a closed position and ramp members in a stowed position according to the principles of the present disclosure.

Referring now to FIG. 1, a rear perspective view of a vehicle 10 is illustrated. The vehicle 10 has a storage bed 12 located above one or more rear wheels 14. In one exemplary implementation, the vehicle 10 is a pickup truck as illustrated. In another exemplary implementation, the vehicle 10 is a vehicle having a cargo area above the rear wheel(s) 14 and a closure member, such as a sport utility vehicle with a rear cargo area and a rear hatch. The storage bed 12 has a floor 16 having a bottom surface 18, sidewalls 20, and a tailgate 22 that is in a closed position. The storage bed 12 includes ramp members 24a and 24b (collectively "ramp members 24") that are shown in a stowed position such that top surfaces 26a and 26b of the ramp members 24 (collectively "top surfaces 26") are flush with the bottom surface 18 of the storage bed 12. In one exemplary implementation, the ramp members 24 are constructed from a lightweight metal, e.g., aluminum, and have top surfaces made of a same material as a remainder of the bottom surface 18 of the storage bed 12. However, it will be appreciated that ramp members 24 may be coupled to and/or stored in various other locations of the vehicle 10.

Figure 2:
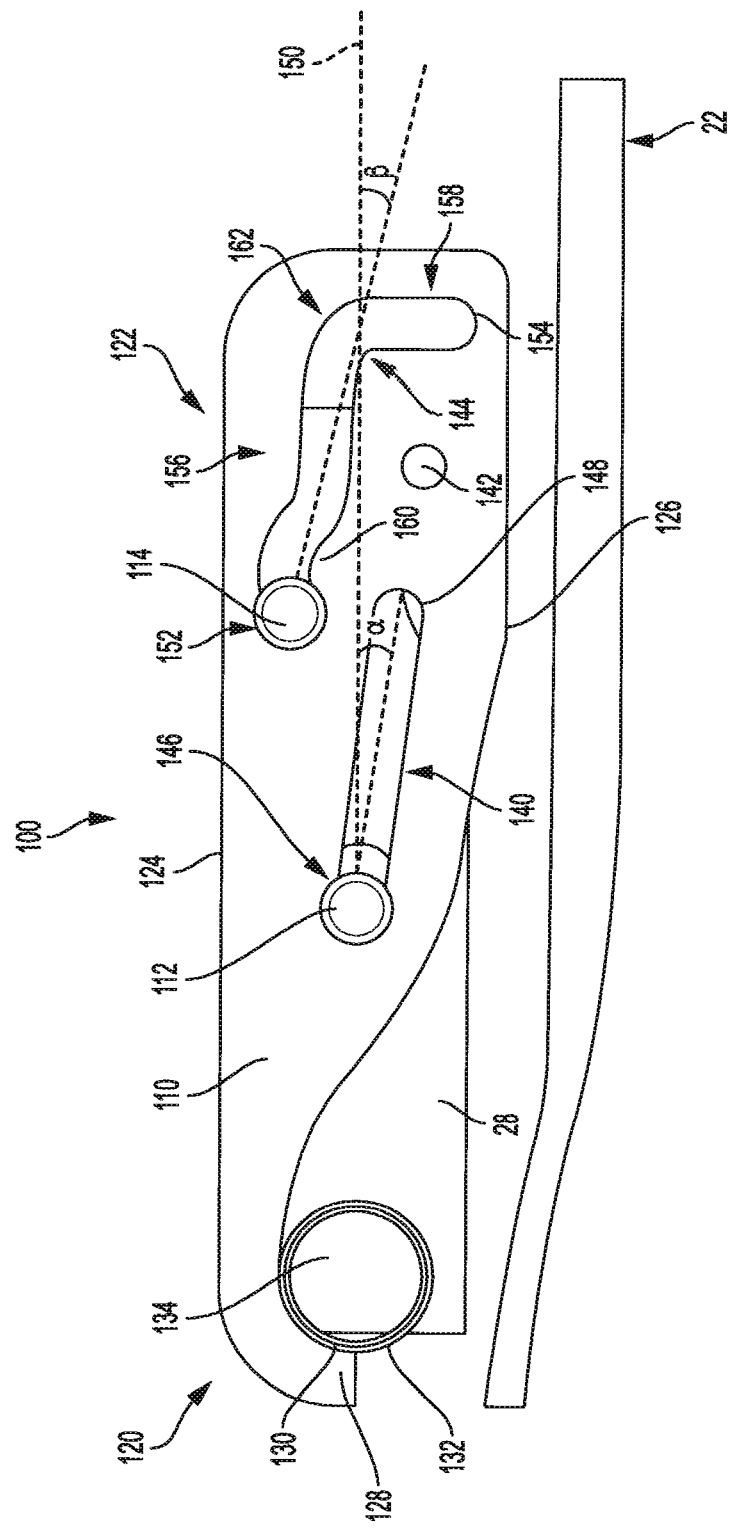
FIG. 2 is a side view of an example tailgate and tailgate overrotation mechanism, according to the principles of the present disclosure.

Referring now to FIG. 2, an example overrotation mechanism 100 is illustrated. In the example embodiment, the overrotation mechanism 100 replaces a pivot cup and bracket of a typical tailgate and enables tailgate 22 to rotate open to both a normal open position (FIG. 3A) and subsequently beyond the normal open position to an overrotation position (FIG. 3C). In the example implementation, overrotation mechanism 100 generally includes an adaptor plate 110, a shift and pivot pin 112, and a shift and rotate pin 114.

In the example embodiment, adaptor plate 110 is a generally flat plate-like member configured to rotatably secure to a main body portion of vehicle 10 such as sidewall 20 or a vehicle structural member (not shown). In the illustrated example, adaptor plate 110 generally includes a forward end 120, a rearward end 122, an upper side or edge 124, and a lower side or edge 126. Forward end 120 generally faces toward a front of vehicle 10 and defines a hinge member 128 with an inner surface 130 coupled to a hinge 132. Alternatively, hinge 132 is formed integrally into forward end 120. In the example embodiment, hinge 132 is an axle or pivot coupling configured to be received within a cavity or pivot cup (not shown) formed in the vehicle main body (e.g., sidewall 20). In this way, tailgate 22 is rotatably coupled to vehicle 10 to facilitate rotating tailgate 22 between open and closed positions. Alternatively, hinge 132 may be a pivot cup that defines a cavity configured to receive an axle or pivot coupling (not shown) extending inboard from a portion of the vehicle such as, for example, sidewall 20. However, it will be appreciated that tailgate 22 can be rotatably coupled to the vehicle 10 in any suitable manner that enables tailgate 22 to function as described herein.

In the example embodiment, adaptor plate rearward end 122 generally defines a first or intermediate guide slot 140, an aperture 142, and a second or rearward guide slot 144. The intermediate slot 140 is configured to receive shift and pivot pin 112 therethrough and enable translation of pin 112 between a forward end 146 and a rearward end 148. As illustrated, intermediate guide slot 140 extends at an angle 'α' relative to a horizontal 150. In one embodiment, angle 'α' is between approximately 0° and approximately 45° or between 0° and 45°. In another example, angle 'α' is between approximately 15° and approximately 30° or between 15° and 30°.

In the example implementation, aperture 142 is configured to receive a fastener (not shown) to secure adaptor plate 110 to one end 30 of a tailgate support 32 (e.g., see FIG. 3A) such as a cable. The other end 34 of support 32 is then coupled to a portion of the vehicle 10 such as, for example, sidewall 20. It will be appreciated, however, that adaptor plate 110 can have any suitable number of apertures 142 to facilitate securing plate 110 to the tailgate 22. Alternatively, tailgate support 32 may be a two-piece foldable linkage (not shown) with ends rotatably coupled to each other and opposite ends respectively rotatably coupled to the adaptor plate 110 and sidewall 20.

In the example embodiment, rearward guide slot 144 is generally L-shaped and is configured to receive shift and rotate pin 114 therethrough. In this way, rearward guide slot 144 is configured to enable translation of pin 114 between an upper forward end 152 and a lower rearward end 154. As illustrated, a horizontally extending first generally straight portion 156 of slot 144 extends at an angle 'β' relative to horizontal 150, and a vertically extending, second generally straight portion 158 of slot 144 extends vertically or substantially vertically. In the example embodiment, forward end 152 includes a retention feature or bump 160 in straight portion 156 to facilitate retaining pin 114 in a forward-most position (e.g., as shown in FIG. 2) without additional movement. In one embodiment, angle 'β' is between approximately 0° and approximately 45° or between 0° and 45°. In another example, angle 'β' is between approximately 15° and approximately 30° or between 15° and 30°. In yet another example, angle is equal to or substantially equal to angle 'β'.

With additional reference to FIGS. 3A-3C, an example operation of tailgate 22 is illustrated. In FIG. 1, tailgate 22 is shown in a closed position. The tailgate 22 is subsequently opened by a user or controller (e.g., an ECU) and rotated 90° or approximately 90° about hinge/pivot cup 132 to a normal open position shown in FIG. 3A. As illustrated, tailgate 22 extends parallel to or substantially parallel to horizontal 150. However, as described herein, overrotation mechanism 100 enables tailgate 22 to over-rotate and be positioned at a downward angle to facilitate loading/unloading.

Referring now to FIG. 3B, when a user desires the overrotation, the tailgate 22 is subsequently moved or translated rearward away from the vehicle rear. It will be appreciated that bump 160 may prevent rearward movement until the tailgate upper end 36 is lifted upward to enable shift and pivot pin 112 to clear bump 160. The rearward movement is facilitated by the shift and pivot pin 112 translating rearward along intermediate guide slot 140 from the forward end 146 (as shown in FIG. 2) toward the rearward end 148. At the same time, the shift and rotate pin 114 translates rearward along rearward guide slot 144 from the forward end 152 to an intersection 162 between horizontal slot portion 156 and the vertical slot portion 158.

Once in this position, the upper end 36 of tailgate 22 is lowered toward the ground such that shift and rotate pin 114 translates downward along vertical slot portion 158 from the intersection 162 to the lower rearward end 154. During this movement, tailgate 22 rotates about shift and pivot pin 112, which is positioned at the rearward end 148 of intermediate guide slot 140. Accordingly, the tailgate 22 rotates about hinge/pivot cup 132 between the closed and normal open positions, and subsequently rotates about shift and pivot pin 112 between an extended normal open position and an overrotated position.

In the example overrotated position shown in FIG. 3C, tailgate 22 is oriented downward toward the ground at an angle 'γ' relative to horizontal 150. In one embodiment, angle 'γ' is between approximately 0° and approximately 60° or between 0° and 60°. In another embodiment, angle 'γ' is between approximately 15° and approximately 45° or between 15° and 45°. In yet another embodiment, angle 'γ' is between approximately 20° and approximately 30° or between 20° and 30°. In yet another embodiment, angle 'γ' is 25° or approximately 25°.

Figure 4:
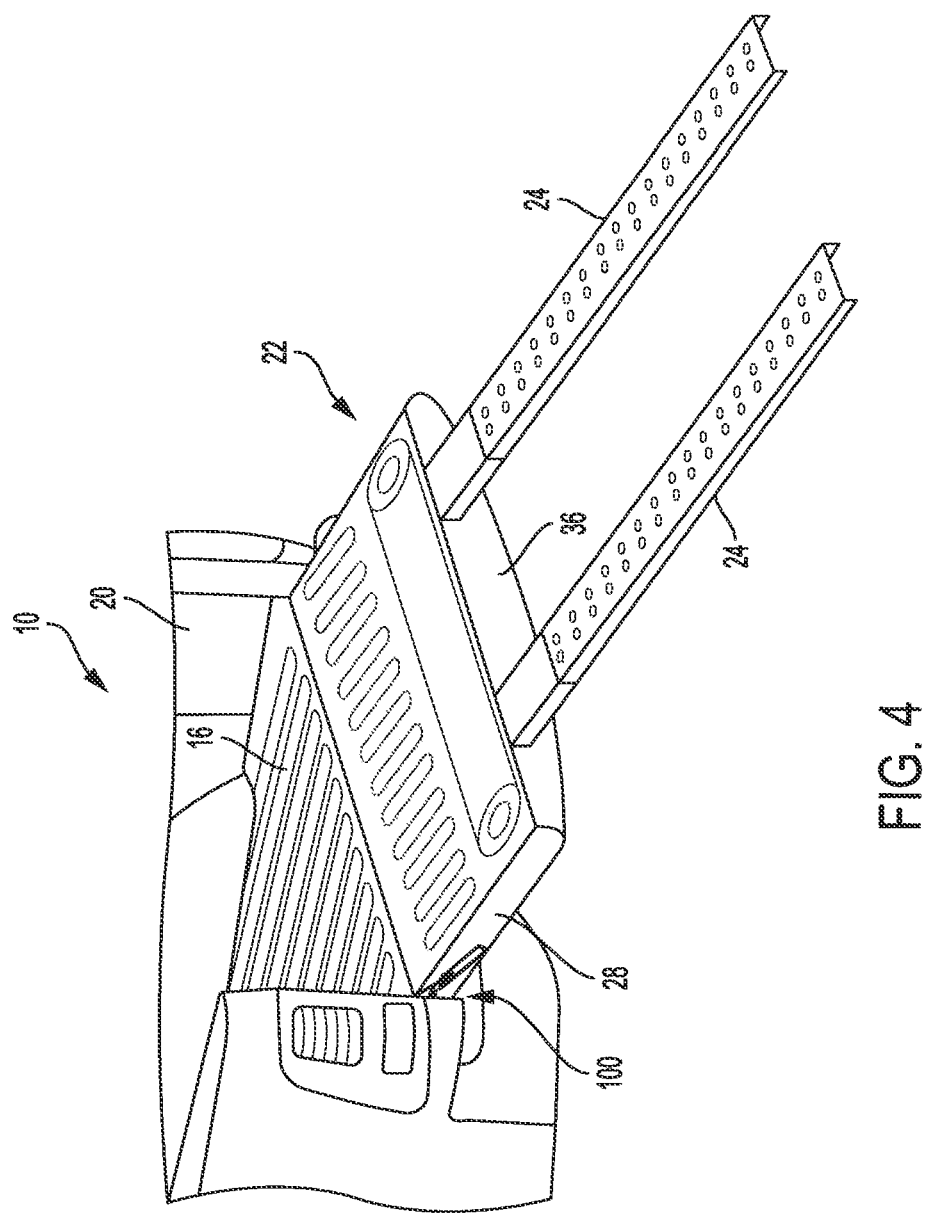
FIG. 4 is a rear perspective view of a vehicle with a tailgate in the overrotated position with example ramp members coupled thereto, according to the principles of the present disclosure.

Referring now to FIG. 4, once tailgate 22 is rotated to the overrotation position, the ramp members 24 (or other ramps) can be coupled to the tailgate 22 to enable loading/unloading of the vehicle storage bed 12. Because overrotation mechanism 100 enables the overrotation of tailgate 22 beyond the normal horizontal open position (FIG. 3A), there is less distance between the tailgate end 36 and the ground than in the normal open position, which reduces the load angle into the storage bed 12 and enables the ramp members 24 to be shorter.

Described herein are systems and methods for enabling overrotation of a vehicle tailgate. An overrotation mechanism includes slots to guide pins extending from the tailgate in a rearward and downward motion to an overrotation position. Such a position reduces the load angle into the vehicle and enables the use of loading ramps that are shorter than what would be required for typical tailgates, which are limited to 90° of rotation from the closed position.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A tailgate assembly for a vehicle, the tailgate assembly comprising:
a tailgate configured to rotatably couple to a main body of the vehicle; and
an overrotation mechanism coupled to a sidewall of the tailgate and configured to be disposed between the tailgate and the main body, the overrotation mechanism configured to enable the tailgate to move between a closed position and a horizontal open position, and between the horizontal open position and an overrotation position where the tailgate is disposed toward the ground at an angle relative to a horizontal,
wherein the overrotation mechanism comprises:
an adaptor plate configured to rotatably couple to the main body to enable the tailgate to move between the closed position and the horizontal open position; and
a first pin coupled to the tailgate and operably associated with the adaptor plate.

2. The assembly of claim 1, wherein the adaptor plate includes a rearward guide slot receiving the first pin, wherein the first pin is configured to translate along the rearward guide slot.

3. The assembly of claim 2, wherein the rearward guide slot includes a generally horizontal first portion and a generally vertical second portion such that from the horizontal open position, the first pin translatable along the generally horizontal first portion to move the tailgate away from the vehicle, and the first pin subsequently translatable downward along the generally vertical second portion to move the tailgate to the overrotation position.

4. The assembly of claim 3, wherein the rearward guide slot includes a bump in the generally horizontal first portion configured to maintain the first pin therein to facilitate preventing inadvertent translation of the first pin into the generally vertical second portion.

5. The assembly of claim 1, wherein the overrotation mechanism further includes a second pin coupled to the tailgate and operably associated with the adaptor plate.

6. The assembly of claim 5, wherein the adaptor plate includes an intermediate guide slot receiving the second pin, wherein the second pin is configured to translate along the intermediate guide slot.

7. The assembly of claim 1, wherein:
the tailgate includes a proximal end and an opposed distal end, the proximal end being rotatably coupled to the main body;
the overrotation mechanism is coupled to a sidewall of the tailgate at the proximal end thereof and disposed between the tailgate proximal end and the main body;
the tailgate is slidably coupled to the overrotation mechanism, and the overrotation mechanism is pivotally coupled to the main body to rotatably couple the tailgate to the main body; and the overrotation mechanism includes a hinge configured to rotatably couple to the vehicle to enable rotational movement of the tailgate relative to the vehicle.

8. The assembly of claim 1, wherein angle is between approximately 0° and approximately 60°.

9. The assembly of claim 8, wherein angle is between approximately 15° and approximately 45°.

* * * * *